(No Model.) 2 Sheets—Sheet 1.
J. J. SINGLEY.
CORN OR SORGHUM HARVESTER.
No. 407,944. Patented July 30, 1889.
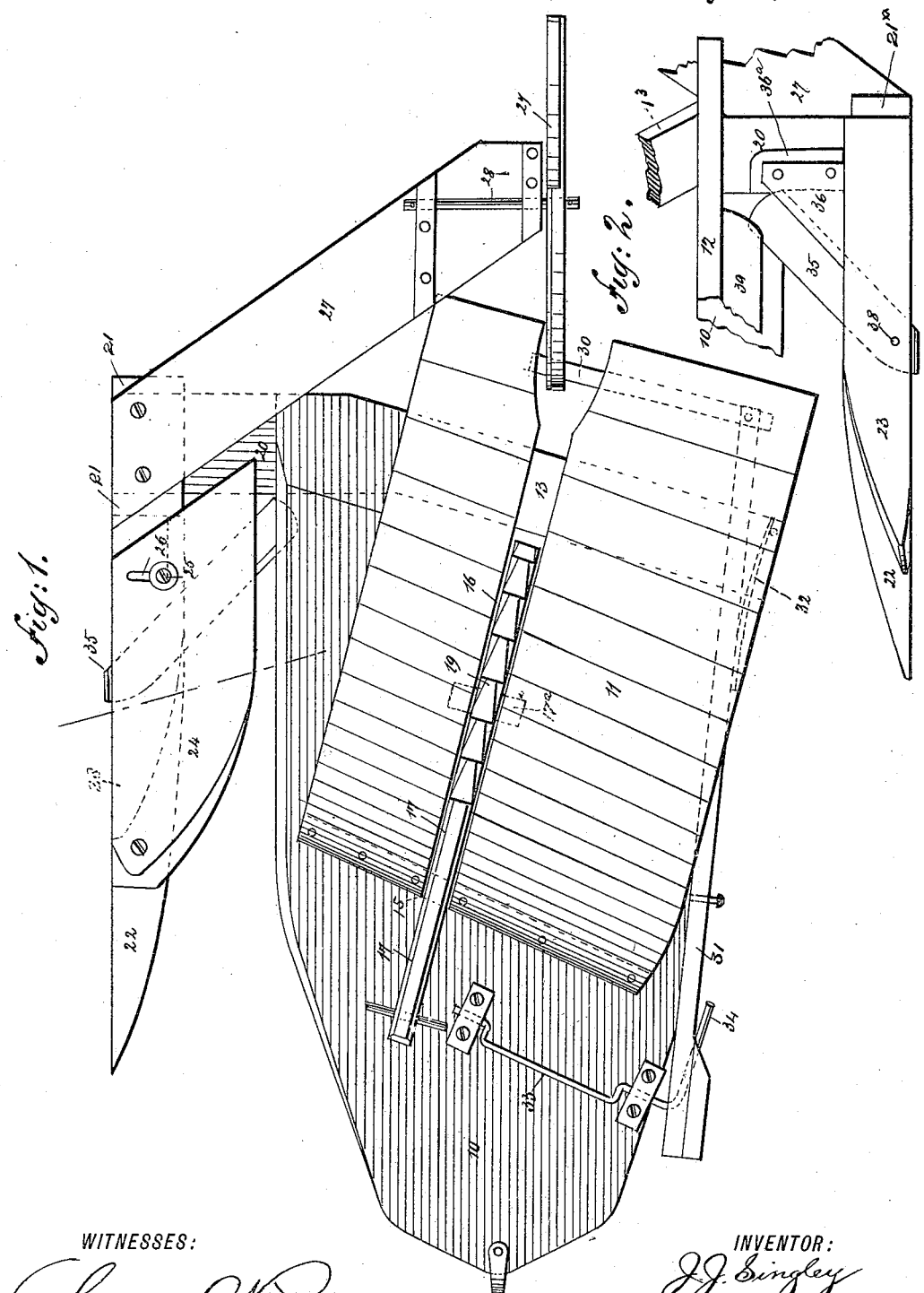

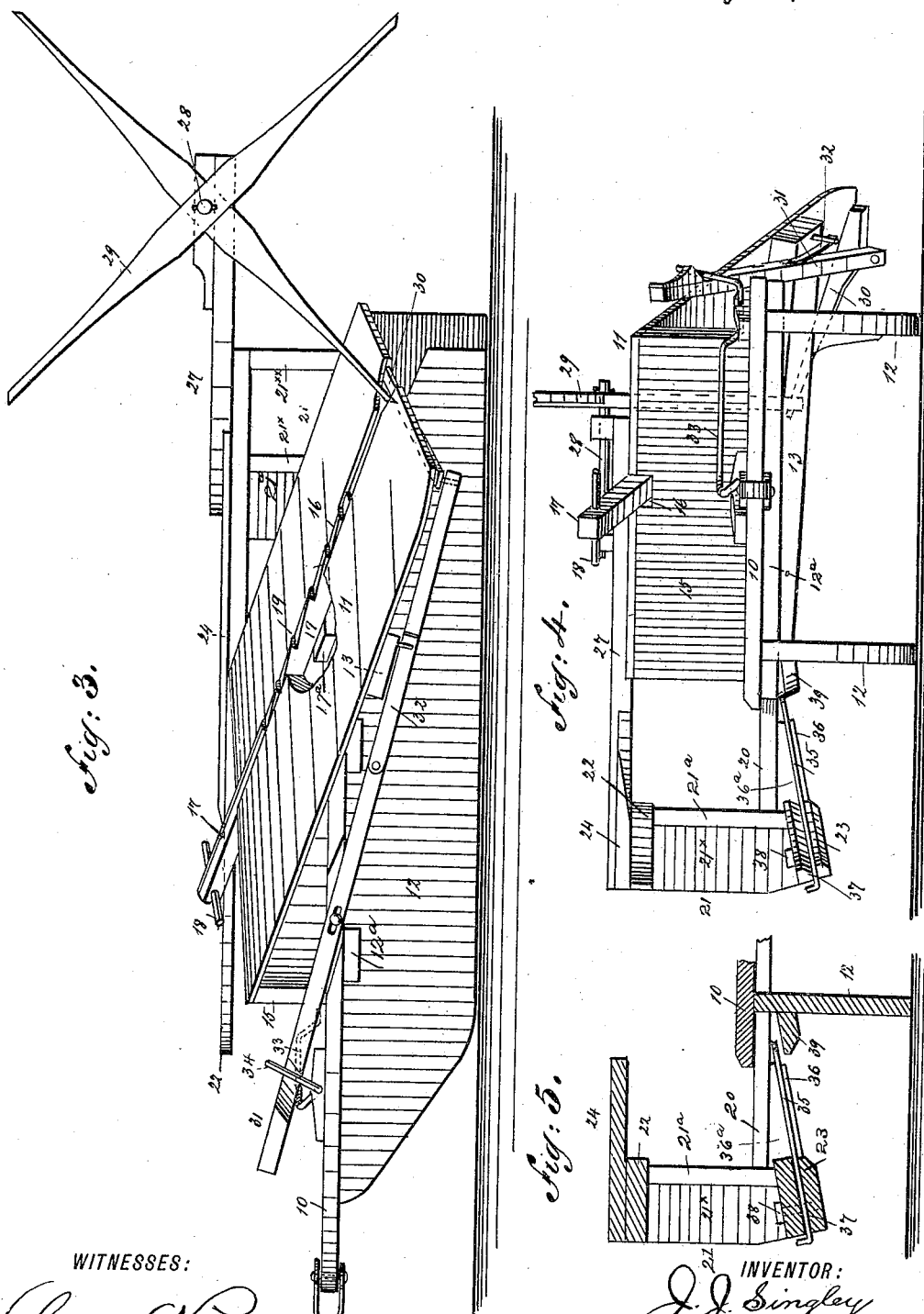

UNITED STATES PATENT OFFICE.

JOSEPH J. SINGLEY, OF EL DORADO, KANSAS.

CORN OR SORGHUM HARVESTER.

SPECIFICATION forming part of Letters Patent No. 407,944, dated July 30, 1889.

Application filed September 29, 1888. Serial No. 286,758. (No model.)

*To all whom it may concern:*

Be it known that I, JOSEPH J. SINGLEY, of El Dorado, in the county of Butler and State of Kansas, have invented new and useful Improvements in Corn or Sorghum Harvesters, of which the following is a full, clear, and exact description.

My invention relates to an improvement in harvesters for corn and sorghum, and has for its object to provide an implement of simple, durable, and effective construction, whereby the stalks may be conveniently and expeditiously cut and delivered from the machine to the ground at any time and in any desired quantities.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the implement, the inclined bed being broken away to show the button or cross-piece on the bar 17. Fig. 2 is a detail view illustrating the attachment of the knife. Fig. 3 is a side elevation. Fig. 4 is a front elevation, and Fig. 5 is a detail transverse sectional view taken vertically through the grainward portion of the machine.

In carrying out the invention the body of the implement, consisting of the platform 10 and attached rearwardly-inclined bed 11, is usually supported by runners 12, extending from front to rear, one at each side. If in practice it is found desirable, wheels may be substituted for the runners. The platform 10 does not extend to the rear end of both runners, being cut away diagonally in direction of the left-hand runner and beveled, and the said left-hand runner is given a rearward inclination upon the upper surface at the rear, as best shown in Fig. 3.

A cross-bar 13 is secured to the inner face of the right-hand runner and carried over the inclined surface of the left-hand runner and beyond the same. This cross-bar 13 is purposed to serve as a support for the rear end of the bed 11, the said bed being also supported upon the inclined surface of the left-hand runner. The cross-bar $12^a$ connects the runners near their forward ends and supports the front end of the platform.

The bed 11 is elevated at the front by a beam 15, secured to the platform, and is located diagonally of the latter, extending at the rear beyond the outer face of the left-hand runner, having a sheer in direction of said runner. The platform and bed are essentially of the same width, and the latter is provided with a central longitudinal opening 16, extending from end to end, of greatest width at the rear end, as best shown in Fig. 1. In the said opening 16 a bar 17 is held to slide, provided at its upper end with a handle 18, and a series of notches 19 produced in its upper surface. The bar 17 is usually held in place by a button or lug $17^a$ upon its under side, engaging the under face of the bed at each side of the opening, as shown in Figs. 1 and 3, and the said bar is adapted to be used for facilitating the discharge of the accumulated stalks, and for packing the same upon the bed. The stacking-bar 17 rests between its ends in a notch in the upper edge of the beam 15, (see Fig. 4,) and its rear end rests on the rear part of the platform 10, and may be reciprocated thereover and over the cross-bar 13. (See Fig. 1.) The platform 10 projects beyond the side of the right-hand runner, and at the rear of the said runner a horizontal beam 20 is secured extending outward, and to the extremity of said bar a framing 21 is secured. The framing 21 consists of two upright bars $21^\times$ $21^{\times\times}$, secured to the front and rear faces of the beam 20 and the upright bar $21^a$, secured to the front side of bar $21^\times$.

To the top and bottom of the framing, vertically-aligning guide-fingers 22 and 23 are attached, extending forward parallel with the runners. The fingers are curved outwardly upon their inner face from the rear in direction of the front, terminating in sharp forward extremities.

Upon the upper finger 22 a second and wider finger 24 is pivoted, which finger is laterally adjustable, being pivoted at its forward end and regulated at its rear end by a set-screw 25, passing through a slot 26 in the finger 24 into the finger 22, as best shown in Fig. 1. A rearwardly-extending diagonal bar 27 is attached to the finger 22 or to the upper side of the framing, having journaled upon its free end a spindle 28, carrying a wheel 29, formed of crossed arms, as shown in Fig. 3.

The arms of the wheel are adapted to enter the enlargement of the bed-opening and form a rack against which the stalks are stacked. The wheel is held in this position any desired length of time by a latch 30, sliding beneath the bed and spanning the opening therein. The movement of the latch is controlled at will through the medium of a lever 31, to which it is attached, pivoted upon the left-hand runner and provided with a spring 32, whereby the latch is normally held across the bed-opening, as illustrated in Fig. 1.

The lever 31 is manipulated by a foot-lever 33, pivoted upon the platform 10, convenient to the driver, which foot-lever is provided with a crank-arm 34, engaging an offset upon the lever 31.

The knife 35 is readily detachable, and is supported upon a triangular plate 36, attached to a block 36ª, secured to the under side of the bar or beam supporting the framing and the lower finger, as best shown in Fig. 2. The knife 35 is passed through a slot 37, formed transversely in the lower finger, and a pin 38 is passed through the finger and knife, as best shown in Fig. 5. The inner end of the knife may rest upon a ledge 39, if found desirable, which ledge projects outward from the right-hand runner. The knife cannot swing rearward at its inner end because it is secured at its outer end by pin 38, and bears at its back edge against the rear wall of the slot 37.

In operation, as the implement is drawn along the ground, the stalks are guided by the fingers to the knife, and being cut thereby, they fall upon the bed. As the wheel has been previously locked by the latch 30, the stalks are piled against the same and likewise upon the stacking-bar. When sufficient stalks have accumulated upon the bed, the lever 31 is manipulated and the latch drawn from the bed-opening. The wheel being thus released, the stalks are free to drop from the inclined surface of the bed to the ground at the left of the implement. The dumping of the stalks is greatly facilitated by pushing the notched stacking-bar rearward.

Having thus described my invention, I claim as new and desire to secure by Letters Patent—

1. The combination, with a platform and vertically-aligning guide-fingers secured thereto at one side, the upper finger being laterally adjustable, of a knife detachably held between the lower finger and platform, substantially as shown and described.

2. The combination, with a platform, vertically-aligning guide-fingers secured thereto at one side, the upper finger whereof is adjustable, of a detachable knife passed diagonally through the lower finger, and a pin passing through the finger and knife, substantially as shown and described.

3. The combination, with a platform, vertically-aligning guide-fingers secured thereto at one side, and a detachable knife diagonally secured to the lower finger, and extending inward to the platform, of a bed inclined downward toward the rear and side, and supported upon the platform provided with a longitudinal opening, and a notched stacking-bar sliding in the bed-opening, substantially as shown and described.

4. The combination, with a platform, vertically-aligning guide-fingers secured thereto at one side, and a detachable knife diagonally secured to the lower finger and extending inward to the platform, of a bed inclined downward toward the rear and side, supported upon the platform, and provided with a longitudinal opening, and a notched stacking-bar sliding in the bed-opening, substantially as set forth, a latch spanning the bed-opening, a rack-wheel engaged thereby and prevented by it from rotating, a foot-lever, and a spring-actuated lever connecting the foot-lever and latch, substantially as set forth.

5. The combination, with a platform, vertically-aligning guide-fingers secured thereto at one side, and a detachable knife diagonally secured to the lower finger and extending inward to the platform, of a bed supported on the platform and provided with a longitudinal opening a notched stacking-bar sliding in said opening, a spring-actuated latch spanning the bed-opening, a rotary rack-wheel engaging the latch, and means, substantially as shown and described, for actuating the latch, as and for the purpose specified.

6. The combination, with a bed provided with a longitudinal opening, a latch spanning the opening, and a notched stacking-bar sliding in the said bed-opening, of a rotatable rack-wheel engaging the latch, a foot-lever, and a spring-actuated lever connecting said latch and foot-lever, substantially as shown and described.

JOSEPH J. SINGLEY.

Witnesses:
CHAS. F. BRENTON,
J. W. HEISER.